United States Patent [19]
Young et al.

[11] Patent Number: 5,860,120
[45] Date of Patent: Jan. 12, 1999

[54] DIRECTORY-BASED COHERENCY SYSTEM USING TWO BITS TO MAINTAIN COHERENCY ON A DUAL PORTED MEMORY SYSTEM

[75] Inventors: Gene F. Young; Roy M. Stevens, both of Lexington; Larry C. James, West Columbia, all of S.C.

[73] Assignee: Intel Corporation, Santa Clara, Calif.

[21] Appl. No.: 763,702

[22] Filed: Dec. 9, 1996

[51] Int. Cl.[6] ...................................................... G06F 12/08
[52] U.S. Cl. .......................... 711/156; 711/141; 711/144
[58] Field of Search .................................... 711/121, 130, 711/131, 141, 144, 145, 147, 149, 156; 395/821, 856

[56] References Cited

U.S. PATENT DOCUMENTS

| | | | |
|---|---|---|---|
| 4,764,865 | 8/1988 | Temple, III | 364/200 |
| 4,924,379 | 5/1990 | Kirrmann | 364/200 |
| 4,937,781 | 6/1990 | Lee et al. | 364/900 |
| 5,255,387 | 10/1993 | Arnold et al. | 395/600 |
| 5,276,842 | 1/1994 | Sugita | 395/425 |
| 5,313,551 | 5/1994 | Labrousse et al. | 395/425 |
| 5,329,630 | 7/1994 | Baldwin | 395/425 |
| 5,442,758 | 8/1995 | Slingwine et al. | 395/375 |
| 5,459,851 | 10/1995 | Nakajima et al. | 395/476 |
| 5,568,633 | 10/1996 | Boudou et al. | 395/468 |
| 5,673,413 | 9/1997 | Deshpande et al. | 395/468 |
| 5,680,576 | 10/1997 | Laudon | 395/472 |
| 5,701,422 | 12/1997 | Kirkland, Jr. et al. | 395/309 |
| 5,737,568 | 4/1998 | Hamaguchi et al. | 395/448 |
| 5,749,095 | 5/1998 | Hagersten | 711/141 |
| 5,752,258 | 5/1998 | Guzovskiy | 711/120 |
| 5,752,264 | 5/1998 | Blake et al. | 711/144 |

OTHER PUBLICATIONS

Xiao Luo, "Performance Evaluation of A Multiprocessor System with Dual–Port Directory Caches", 1991, pp. 215–218.

Xiao Luo & Jon C. Muzio, "A Fault–Tolerant Multiprocessor Cache Memory", 1994, pp. 52–57.

Jeffrey Kustin, "The Stanford Flash Multiprocessor", 1994, pp. 302–313.

*Primary Examiner*—Tod R. Swann
*Assistant Examiner*—Pierre M. Bataille
*Attorney, Agent, or Firm*—Blakely, Sokoloff, Taylor & Zafman

[57] ABSTRACT

An improved directory-based cache coherency memory system for a multiprocessor computer system. The memory system includes a dual ported system memory shared by the multiple processors within the computer system; a plurality of data cache memories, at least one data cache memory associated with each processor; and first and second memory busses, the first memory bus connecting a first subset of processors and associated data cache memories to a first port (PORT A) of the system memory, and the second memory bus connecting a second subset of processors and associated data cache memories to a second port (PORT B) of the system memory. Cache coherency is maintained through the use of memory line state information saved with each line of memory within the system memory and data cache memories. The system memory contains a system memory line state for each line of memory saved within the system memory, the system memory line state being any one of the group: SHARED PORT A, SHARED BOTH, OWNED PORT A and OWNED PORT B. Each one of these states is represented by a different two bit code saved with each line of memory in system memory. Additionally, each data cache memory contains a data cache memory line state for each line of memory saved within the data cache memory, the data cache memory line state being any one of the group: MODIFIED, EXCLUSIVE, SHARED, or INVALID.

6 Claims, 4 Drawing Sheets

---

TWO – BIT COHERENCY STATE TABLE DEFAULT STATE: SHARED PORT A

| INITIAL STATE | | PORT A READ | | PORT B READ | | PORT A WRITE | |
|---|---|---|---|---|---|---|---|
| | | ACTION | NEXT STATE | ACTION | NEXT STATE | ACTION | NEXT STATE |
| SHARED PORT A | S – A | NONE | S – A | NONE | S – AB | NONE | O – A |
| SHARED BOTH | S – AB | NONE | S – AB | NONE | S – AB | PORT B INVALIDATE | O – A |
| OWNED PORT A | O – A | PORT A CASTOUT – INVALIDATE** | S – A | PORT A CASTOUT – SHARED | S – AB | PORT B CASTOUT – INVALIDATE** | O – A |
| OWNED PORT B | O – B | PORT B CASTOUT – SHARED | S – AB | PORT B CASTOUT – INVALIDATE** | S – AB | PORT B CASTOUT – INVALIDATE | O – A |

\* SOME OF THESE INVALIDATES WILL NOT BE GENERATER FOR A 3 – BIT LST PROTOCOL WITH THE HOME DEFAULT STATE.
\*\* THESE CYCLES TYPICALLY WOULD ONLY HAPPEN IN SOME CASES FOR PORTS WITH MULTIPLE PROCESSORS.

NOTE: ASSUMES REQUESTING PORT HANDLES LOCAL COHERENCY PROTOCOLS.

FIG. 3A

TWO – BIT COHERENCY STATE TABLE DEFAULT STATE: SHARED PORT A

| INITIAL STATE | | PORT A READ | | PORT B READ | | PORT A WRITE | |
|---|---|---|---|---|---|---|---|
| | | ACTION | NEXT STATE | ACTION | NEXT STATE | ACTION | NEXT STATE |
| SHARED PORT A | S–A | NONE | S–A | NONE | S–AB | NONE | O–A |
| SHARED BOTH | S–AB | NONE | S–AB | NONE | S–AB | PORT B INVALIDATE | O–A |
| OWNED PORT A | O–A | PORT A CASTOUT–INVALIDATE** | S–A | PORT A CASTOUT–SHARED | S–AB | PORT B CASTOUT–INVALIDATE** | O–A |
| OWNED PORT B | O–B | PORT B CASTOUT–SHARED | S–AB | PORT B CASTOUT–INVALIDATE** | S–AB | PORT B CASTOUT–INVALIDATE | O–A |

\* SOME OF THESE INVALIDATES WILL NOT BE GENERATER FOR A 3 – BIT LST PROTOCOL WITH THE HOME DEFAULT STATE.

\*\* THESE CYCLES TYPICALLY WOULD ONLY HAPPEN IN SOME CASES FOR PORTS WITH MULTIPLE PROCESSORS.

NOTE: ASSUMES REQUESTING PORT HANDLES LOCAL COHERENCY PROTOCOLS.

FIG. 3B

| PORT B WRITE | | DMA READ (NON-CACHING) | | DMA WRITE (NON-CACHING) | | COPYBACK (FROM DATA CACHE) | |
|---|---|---|---|---|---|---|---|
| ACTION | NEXT STATE | ACTION | NEXT STATE | ACTION | NEXT STATE | ACTION | NEXT STATE |
| PORT A INVALIDATE* | O-B | NONE | S-A | PORT A INVALIDATE* | S-A | — | — |
| PORT A INVALIDATE* | O-B | NONE | S-AB | BOTH INVALIDATE* | S-A | — | — |
| PORT A CASTOUT-INVALIDATE | O-B | PORT A CASTOUT-SHARED | S-A | PORT A CASTOUT-INVALIDATE | S-A | NONE | S-A |
| PORT B CASTOUT-INVALIDATE** | O-B | PORT B CASTOUT-SHARED | S-AB | PORT B CASTOUT-INVALIDATE | S-A | NONE | S-A |

5,860,120

DIRECTORY-BASED COHERENCY SYSTEM USING TWO BITS TO MAINTAIN COHERENCY ON A DUAL PORTED MEMORY SYSTEM

The present invention relates to multiprocessor computer systems having multiple cache memories and a shared memory and, more particularly, to multiprocessor computer systems employing directory-based protocols for maintaining cache coherency.

BACKGROUND OF THE INVENTION

The past several years have seen near exponential increases in the performance, speed, integration density, and capacity of computer systems. These improvements coupled with the decrease in costs for computer systems, have resulted in more expansive utilization of computer systems the development of more sophisticated and resource intensive computer applications. According to recent historical trends, application memory requirements double yearly. Although the costs for computer systems and components has steadily declined in recent years, high speed RAM memory utilized in system main memory and cache memories remains one of the highest cost components within most computer systems.

System and cache memories, used primarily for the temporary storage of data, application software and operating system software, are also being utilized within more sophisticated multiprocessor systems for the storage of parity bits, cache coherency state information, and error detection and/ or correction syndrome bits. These additional memory requirements of multiprocessor systems, and the higher memory demands of advanced operating systems and applications, result in an increased demand, and cost, for high speed RAM.

More efficient methods for utilizing high speed system and cache memory, and for reducing system and cache memory requirements, are desired.

OBJECTS OF THE INVENTION

It is an object of the present invention to provide a new and useful directory-based cache coherency memory system for a multiprocessor computer system.

It is a further object of the present invention to provide such a system method which reduces memory overhead requirement for the storage of memory state information.

It is an additional object of the present invention to provide a new and useful directory-based cache coherency memory system for a multiprocessor computer system including a shared system memory and multiple cache memories, wherein two state bits are associated with each line of memory within system memory for maintaining memory coherency.

SUMMARY OF THE INVENTION

There is provided, in accordance with the present invention, an improved directory-based cache coherency memory system for a multiprocessor computer system. The memory system includes a dual ported system memory shared by the multiple processors within the computer system; a plurality of data cache memories, at least one data cache memory associated with each processor; and first and second memory busses, the first memory bus connecting a first subset of processors and associated data cache memories to a first port (PORT A) of the system memory, and the second memory bus connecting a second subset of processors and associated data cache memories to a second port (PORT B) of the system memory.

Cache coherency is maintained through the use of memory line state information saved with each line of memory within the system memory and data cache memories. The system memory contains a system memory line state for each line of memory saved within the system memory, the system memory line state being any one of the group: SHARED PORT A, SHARED BOTH, OWNED PORT A and OWNED PORT B. Each one of these states is represented by a different two bit code saved with each line of memory in system memory. Additionally, each data cache memory contains a data cache memory line state for each line of memory saved within the data cache memory, the data cache memory line state being any one of the group: MODIFIED, EXCLUSIVE, SHARED, or INVALID.

During memory operations, the system memory line state for a line of memory is read to determine the location of the most current copy of said line of memory within said system memory and data cache memories during any memory I/O operation requiring the most current copy of said line of memory. The system memory line state for the line of memory and the data cache memory line state for each copy of the line of memory contained in the data cache memories is changed to identify the location of the most current copy of the line of memory within the system memory and data cache memories following any memory I/O operation which updates the line of memory.

The above and other objects, features, and advantages of the present invention will become apparent from the following description and the attached drawings.

BRIEF DESCRIPTION OF THE DRAWINGS

FIGS. 3A and 3B together provide a coherency state table for a two bit directory based memory in accordance with a first embodiment of the present invention.

DETAILED DESCRIPTION OF THE PREFERRED EMBODIMENT

NCR Corporation has developed an advanced multiprocessor architecture utilizing system techniques pioneered by NCR while also advantageously making use of standard high volume (SHV) components, such as Intel Pentium Pro processors, PCI I/O chipsets, Pentium Pro chipsets, Pentium Pro bus topology (P6), and standard memory modules (SIMMs and DIMMs). Through careful integration of NCR system techniques with standard SHV components, NCR is able to deliver world class scalability and feature content while still capitalizing on SHV and without the disadvantages associated with full custom development. One implementation of this architecture with addition of an improved directory-based cache coherency memory system according to the teachings of the present invention is shown in FIG. 1.

System Overview

Figure 1:
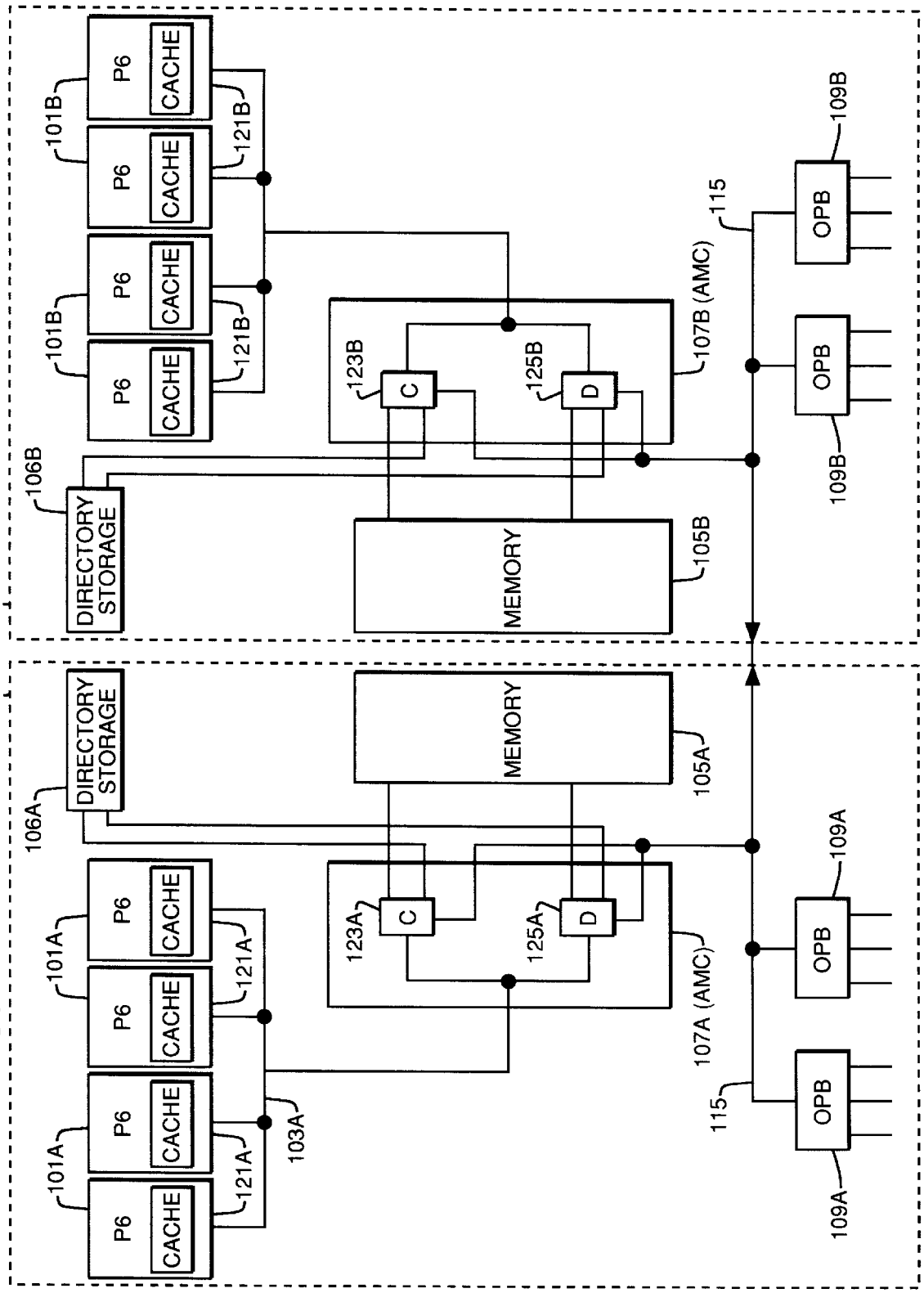
FIG. 1 is a simple block diagram representation of an eight-processor super high volume (SHV) symmetric multiprocessing (SMP) computer system employing one embodiment of the present invention.

Referring now to FIG. 1, there is seen an eight-processor SMP system formed of two four-processor building blocks or complexes, identified by reference numerals A and B. Each complex is seen to include identical structure and components, which are identified by reference numerals ending in either an A or a B, for complex "A" and "B", respectively.

The portion of the system contained in complex A is seen to include up to four processors 101A connected to a high-bandwidth split-transaction processor bus 103A. Associated with each processor 101B is a cache memory 121A. A system memory 105A is connected to bus 103A through an advanced dual-ported memory controller 107A. The processor bus 103A is connected to the first port of memory controller 107A. The second memory controller port connects to a high bandwidth I/O bus 115, also referred to herein as an expansion bus, which provides connection for multiple PCI I/O interfaces 109A. All of these components, with the exception of advanced memory controller 107A, are currently available commodity components. For example, processors 101A may be Intel Pentium Pro processors and busses 103A and 115 may be Pentium Pro (P6) bus topology.

The advanced memory controller (AMC) 107A manages control and data flow in all directions between processor bus 103A and I/O bus 115. The I/O bus may contain P6 to PCI I/O Bridges and another AMC ASIC for connectivity to another processor bus, as will be discussed below. The AMC 107A also controls access to a coherent DRAM memory array. The AMC as presently implemented consists of a control and data slice ASIC pair.

As stated earlier, complex B has a construction identical to complex A. The two complexes are interconnected by expansion bus 115, allowing for communication between the processors 101A and 101B, system memories 105A and 105B, as well as shared I/O devices, cache memories, and other components.

Within each complex, the processors use a bus snooping protocol on the processor bus. Bus snooping is a method of keeping track of data movements between processors and memory. There are performance advantages to this system with a small number of tightly-coupled processors. If a processor needs data that is available in the data cache of another processor on the same bus, the data can be shared by both processors. Otherwise, the data must be retrieved from main memory 105A or 105B, a more time consuming operation which requires system bus traffic. This method enhances system performance by reducing system bus contention.

The characteristics of the NCR architecture shown in FIG. 1 include:
  Capitalizes on industry SHV architecture and supporting commodity chips (IOB. etc.)
  Dual ported memory controllers 107A and 107B permit connection and utilization of dual buses, each operating at 66 MHz with a bandwidth of 64 bits and capable of sustained data transfer rates of 533 MB/s.
  Dual bus approach provides greater scalability through a reduction of bus loadings and provision of a private processor to memory path that can operate independent of IOB to IOB traffic.
  Additional processors and I/O devices can be connected to the expansion bus 115.
  The system as described is able to fill High Availability Transaction Processing (HATP) and Scaleable Data Warehouse (SDW) server needs, while capitalizing on the computer industry's SHV motion.

Memory-Based Coherency

In any system employing a cache memory, and particularly a system employing multiple cache memories and multiple levels of cache memories, data from a given memory location can reside simultaneously in main memory and in one or more cache memories. However, the data in main memory and in cache memory may not always be the same. This may occur when a microprocessor updates the data contained in its associated cache memory without updating the main memory and other cache memories, or when another bus master changes data in main memory without updating its copy in the microprocessor cache memories.

To track the data moving between the processors, system memory modules 105A and 105B, and the various cache memories, the system utilizes a hybrid of memory and cache based coherency. Coherency between system memory and caching agents, i.e., system bus processors with first and possibly second level caches, is maintained via a combination centralized/distributed directory-based cache coherency.

A directory-based cache coherency scheme is a method of keeping track of data movements between the processors and memory. With this approach to data coherency, a memory status table identifies which processors have which lines of memory in their associated cache memories. When a processor requests data, the status table identifies the location within main memory or processor cache where the most current copy of the data resides. The advantage of this method is that no additional work must be performed until a processor needs data that resides in a cache that cannot be accessed through snooping. Directory-based cache coherency is most effective with a large number of tightly-coupled processors on a system bus.

The centralized/distributed directory-based cache coherency scheme employed in the system shown in FIG. 1 consists of two directory elements. The central element within the directory scheme resides in system memory and is called the Memory Line Status Table (MLST). In certain embodiments, each memory line within system memory includes a corresponding three bit entry in the MLST. This corresponding entry contains information indicating whether or not a line is cached, and if so, whether it is exclusively owned by one bus, or shared across buses. As discussed below, the present invention provides two bit MLST entries in system memory.

Figure 2:
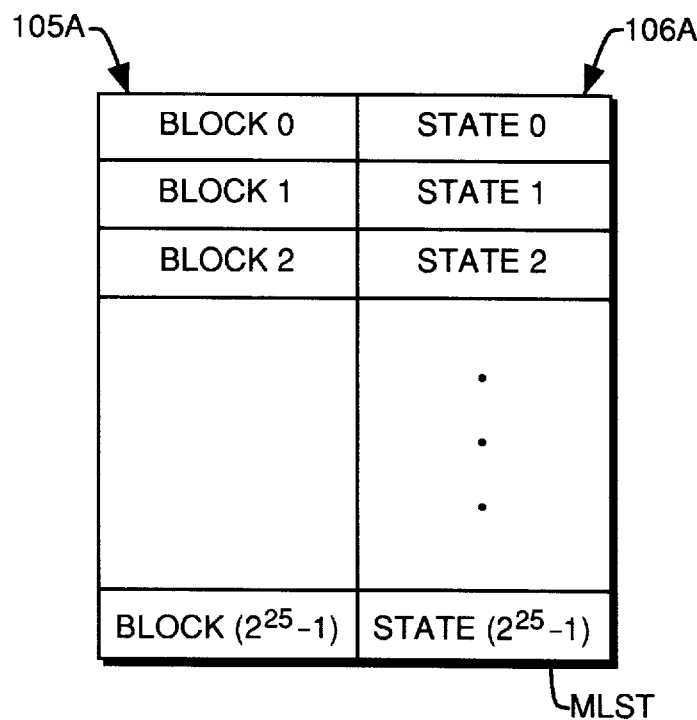
FIG. 2 is a block diagram representation of system memory 105A of FIG. 1 showing a first memory area for the storage of memory blocks and a second memory area for the storage of state information in accordance with conventional techniques for the storage of memory state information.

FIG. 2 illustrates a one gigabyte ($2^{30}$ bytes) system memory, having $2^{25}$ blocks or lines with a block or line size of 32 bytes. In certain embodiments, each line also includes three additional bits for the storage of state information. The section of memory dedicated to the storage of state information forms the MLST. As discussed below, the two bit MLST entries of the present invention reduce the memory overhead required for the storage of memory state information.

Distributed directory elements reside locally within each processor's cache directory. The element associated with a particular processor is referred to as its Processor Line Status Table (PLST). Each cache line has a corresponding entry in the PLST. From the local processor's perspective, this entry contains information indicating whether or not a line contains a valid copy of a main memory line, and if so, whether or not modifications to that line must be broadcast to the rest of the system. From the system's perspective, each processor's PLST is a slave to special system bus cycles known as Memory Intervention Commands (MICs). These cycles query the PLST as to the local state of a particular line, and/or tell the PLST to change that local state. The structure of each cache memory and its associated PLST is similar to the system memory structure shown in FIG. 2.

Memory and Cache State Definitions

The Modified-Exclusive-Shared-Invalid (MESI) cache coherency protocol is a hardware-implemented protocol for maintaining data consistency between main memory and cache memories. A typical implementation of the MESI hardware cache coherency protocol requires the utilization of cache controllers having the ability to:

1. use the same line size for all caches on the memory bus;
2. observe all activity on the memory bus;
3. maintain state information for every line of cache memory; and
4. take appropriate action to maintain data consistency within the cache memories and main memory.

MESI represents four states which define whether a line is valid, if it is available in other caches, and if it has been modified. Each line of memory in a cache includes an associated field which indicates whether the line of memory is MODIFIED, EXCLUSIVE, SHARED, or INVALID. Within the Processor Line Status Table each cache line is marked in one of the four possible MESI states:

MODIFIED (PM)—This state indicates a line of memory which is exclusively available in only this cache, and is modified. Modified data has been acted upon by a processor. A Modified line can be updated locally in the cache without acquiring the shared memory bus. If some other device in the system requires this line, the owning cache must supply the data.

EXCLUSIVE (PE)—This state indicates a line of memory which is exclusively available in only this cache, that this line is not Modified (main memory also has a valid copy), and that the local processor has the freedom to modify this line without informing the system. Exclusive data can not be used by any other processor until it is acted upon in some manner. Writing to an Exclusive line causes it to change to the Modified state and can be done without informing other caches, so no memory bus activity is generated. Note that lines in the (PE) state will be marked (MO) in the MLST, as will be described below.

SHARED (PS)—This state indicates a line of memory which is potentially shared with other caches (the same line may exist in one or more caches). Shared data may be shared among multiple processors and stored in multiple caches. A Shared line can be read by the local processor without a main memory access. When a processor writes to a line locally marked shared, it must broadcast the write to the system as well.

INVALID (PI)—This state indicates a line of memory is not available in the cache. Invalid data in a particular cache is not to be used for future processing, except diagnostic or similar uses. A read to this line will be a "miss" (not available). A write to this line will cause a write-through cycle to the memory bus. All cache lines are reset to the (PI) state upon system initialization.

In accordance with the MESI protocol, when a processor owns a line of memory, whether modified or exclusive, any writes to the owned line of memory within main memory will result in an immediate update of the same data contained within the processor's cache memory.

The Memory Line Status Table marks a memory line in one of three possible states: NOT CACHED (MNC), SHARED (MS), and OWNED (MO). The letter M distinguishes these states from PLST states, which are identified by use of the letter P. Additionally there are bus state bits indicating sharing or ownership by either or both memory buses.

NOT CACHED (MNC): Indicates that no cache has a copy of that line. All memory lines must be reset to the (MNC) state upon system initialization.

SHARED STATE (MS): Indicates that one or more caches potentially have a copy of that line.

OWNED STATE (MO): Indicates that one and only one cache potentially has a copy of that line, and that the data in memory potentially does not match it (Memory data is referred to as stale).

Note the word "potentially" used in the definition of the shared and owned states. There are several situations in which the MLST does not have the most up-to-date information about a particular memory line. For example, the MLST may mark a line as shared by two particular processors since it saw them both read it. However, both processors may have long since discarded that line to make room for new data without informing the MLST (referred to as "silent replacement"). The MLST will naturally "catch up" to the latest state of a particular line whenever an access to that line by some master forces a MIC. In this example, a write by a third processor to this line will initiate a (now superfluous) MIC to invalidate other cached copies, and will bring the MLST up-to-date. Note however that the MLST always holds a conservative view of the state of cache lines. That is, a line that is owned or shared by a processor will always be marked correctly in the MLST. "Stale" information in the MLST takes the form of lines marked owned or shared that are no longer present in any processor's cache.

There are three distinct MIC operations employed within the system described above in order to maintain coherency between system memory and the data cache memories:

INVALIDATE (MBI) This cycle is initiated to cause all data caches with an addressed line to go to the invalid state (PI). It normally occurs in response to certain memory operations that access a line marked shared (MS) in the MLST. Unlike the other MIC operations, an MBI does not require feedback from any PLST as to the current state of the addressed line in a local cache. Rather, the MBI simply requests invalidation of a line if it is present in the cache. Although an MBI requires no logical feedback, it does require a positive acknowledgment from the targeted processor(s) to complete the cycle. This simply indicates that the processor has accepted the invalidate address and is ready for another.

CASTOUT INVALIDATE (MBCOI) This cycle is initiated to cause a cache with a potentially modified copy of an addressed line to cast it out to system memory and to go to the invalid state (PI). It occurs in response to certain memory operations that access a memory line marked owned (MO) in the MLST. If the owning cache has the line in the modified (PM) state, it supplies the data and goes invalid. If the owning cache has the line in the exclusive (PE) state, it acknowledges the MBCOI and goes invalid, but does not supply the data. If the owning cache no longer has the line it simply acknowledges the MBCOI to complete the cycle.

CASTOUT SHARED (MBCOS) This cycle is to cause a cache with a potentially modified copy of an addressed line to cast it out to system memory and to go to the shared state (PS). It occurs in response to certain memory operations that access a memory line marked owned (MO) in the MLST. If the owning cache has the line in the modified (PM) state, it supplies the data and goes to shared. If the owning cache has the line in the exclusive (PE) state, it acknowledges the MBCOS and goes to shared, but does not supply the data. If the owning cache no longer has the line it acknowledges the MBCOS to complete the cycle. Note that in the last case the MLST goes to shared (MS) even though the line is not cached. This is because the MLST cannot distinguish a line that is exclusive (PE) in the owner's cache from a line that is invalid (PI).

As stated above for certain embodiments the MLST includes three memory state bits per line to indicate the current state of the line. One bit indicates shared or owned and the other two depict which bus (A or B) or buses (A and B) have the line shared or owned. Bus ownership indicates that one of the processors on that bus owns the line. Note that a line can be owned by only one processor and therefore by only one bus. A shared line can be shared by one or more processors on each bus.

TABLE 1

Memory State Bits for Bit-per-Bus Protocol

| OBA | STATE BIT DEFINITIONS | DESCRIPTION |
| --- | --- | --- |
| 000 | MNC - Not Cached; | Not owned or shared |
| 001 | MS - Shared; | Shared on Bus A |
| 010 | MS - Shared; | Shared on Bus B |
| 011 | MS - Shared; | Shared on Buses A and B |
| 100 | x - (not a valid state) | |
| 101 | MO - Owned; | Owned by Bus A |
| 110 | MO - Owned; | Owned by Bus B |
| 111 | x - (not a valid state) | |

It is apparent from the discussion above that a directory-based coherency system, such as the centralized/distributed directory-based cache coherency scheme described, requires a significant amount of additional memory for the storage of state information; this state storage overhead being a fixed percentage of the total amount of memory available. For example, in a system having one gigabyte of system memory with a block or line size of 32 bytes, each line including three bits state information, a MLST of twelve megabytes will be required for the storage of state information.

Two Bit Memory Line Status Table

This present invention provides a method for using two bits per line of system memory to maintain coherency on a dual ported memory system, such as the system described above with reference to FIGS. 1 and 2. Each system bus includes its own system memory port and the system memory is responsible for insuring the coherent use of the memory lines that it stores. The two bits is used to filter the number of cycles required to maintain the coherency.

In the simplest dual ported memory all read and write cycles coming from one system bus cause a castout shared or castout invalidate respectively to the other system memory port. Maintaining coherency information allows the memory to reduce the number of coherency cycles that must be issued. The more accurate the information the more unnecessary cycles can be eliminated. The most accurate coherency representation would require six states or 3 bits of status per memory block, as shown in Table 2 provided above. These states are "Shared Port A", "Shared Port B", "Shared Both", "Owned Port A", Owned Port B", and "Uncached". Two states need to be eliminated to allow coherency representation by two bits of status. The uncached, or home, state can be removed by assuming the default state of an uncached line is one of the four possible states. It is probably reasonable to assume that after a warm-up period most lines of cache are in a shared state, therefore the default line state could be "Shared—Port A", "Shared Port B", or "Shared Both". If the "Shared Both" state were the default state, then ownership operations (writes) would require invalidation operations to both ports. Therefore the default should be either of the shared only states. Any of the shared states could be removed, but the "Shared Both" state should be kept along with one of the shared only states. Note that if the "Shared Port B" state is removed the "Shared Both" would be used for the "Shared Port B" case as well as the "Shared Both" case. This would cause an additional coherency operation if a write occurs to an entry marked "Shared Both" when it was actually only shared by Port B.

FIGS. 3A and 3B together provide a state table with a default state of "Shared Port A". The states of the bits are "Shared Port A", "Shared Both", "Owned Port A", and "Owned Port B". The table of FIGS. 3A and 3B shows the coherency and state transitions for various read, write and DMA memory operations.

It can thus be seen that there has been provided by the present invention a new and useful directory-based cache coherency memory system for a multiprocessor computer system including a shared system memory and multiple cache memories such as the one shown on FIG. 1, wherein two state bits are associated with each line of memory within system memory for maintaining memory coherency, thereby reducing memory overhead requirements for the storage of memory state information.

Although the presently preferred embodiment of the invention has been described, it will be understood that various changes may be made within the scope of the appended claims.

What is claimed is:

1. A method for maintaining cache coherency within a computer system including multiple processors, a data cache memory associated with each processor, a system memory shared by said multiple processors, and first and second memory busses, said first memory bus connecting a first subset of said multiple processors and associated data cache memories to a first port (PORT A) of said system memory, and said second memory bus connecting a second subset of said multiple processors and associated data cache memories to a second port (PORT B) of said system memory; said method comprising the steps of:

storing a data cache memory line state with each line of memory saved within said data cache memories, said data cache memory line state being any one of the group: MODIFIED, EXCLUSIVE, SHARED, or INVALID;

storing a system memory line state with each line of memory saved within said system memory, said system memory line state being any one of the group: SHARED PORT A, SHARED BOTH, OWNED PORT A and OWNED PORT B;

reading the system memory line state for a line of memory to determine the location of the most current copy of said line of memory within said system memory and data cache memories during a memory I/O operation requiring the most current copy of said line of memory; and changing the system memory line state for said line of memory and the data cache memory line state for each copy of said line of memory contained in said data cache memories to identify the location of the most current copy of said line of memory within said system memory and data cache memories following a memory I/O operation which updates said line of memory.

2. The method for maintaining cache coherency in accordance with claim 1, further comprising the step of:

establishing a default system memory line state of SHARED PORT A for lines of memory saved within said system memory.

3. The method for maintaining cache coherency in accordance with claim 1, wherein:

each one of said four system memory line states are represented by a different two bit code saved with each line of memory saved within said system memory.

4. A directory-based cache coherency memory system for a computer system including multiple processors, the memory system comprising:

a system memory shared by said multiple processors, said system memory containing a system memory line state for each line of memory saved within said system memory, said system memory line state being any one of the group: SHARED PORT A, SHARED BOTH, OWNED PORT A and OWNED PORT B;

a plurality of data cache memories, at least one data cache memory associated with each one of said processors, each one of said data cache memories containing a data cache memory line state for each line of memory saved within said data cache memories, said data cache memory line state being any one of the group: MODIFIED, EXCLUSIVE, SHARED, or INVALID; and first and second memory busses, said first memory bus connecting a first subset of said multiple processors and associated data cache memories to a first port (PORT A) of said system memory, and said second memory bus connecting a second subset of said multiple processors and associated data cache memories to a second port (PORT B) of said system memory.

5. The directory-based cache coherency memory system in accordance with claim 4; further comprising:

means for reading the system memory line state for a line of memory to determine the location of the most current copy of said line of memory within said system memory and data cache memories during a memory I/O operation requiring the most current copy of said line of memory; and means for changing the system memory line state for said line of memory and the data cache memory line state for each copy of said line of memory contained in said data cache memories to identify the location of the most current copy of said line of memory within said system memory and data cache memories following a memory I/O operation which updates said line of memory.

6. The directory-based cache coherency memory system in accordance with claim 4, wherein:

each one of said four system memory line states are represented by a different two bit code saved with each line of memory saved within said system memory.

* * * * *